(12) United States Patent
Lochocki, Jr. et al.

(10) Patent No.: US 10,030,765 B2
(45) Date of Patent: Jul. 24, 2018

(54) PRE-REMEDIAL FAULT CONTROL IN A TRANSMISSION

(71) Applicant: GM GLOBAL TECHNOLOGY OPERATIONS LLC, Detroit, MI (US)

(72) Inventors: Ronald F. Lochocki, Jr., Ypsilanti, MI (US); Scott D. Biggs, Milford, MI (US); Moussa Ndiaye, Canton, MI (US); Patrick M. Gibson, Ann Arbor, MI (US); Brian W. Hanselman, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 235 days.

(21) Appl. No.: 15/077,241

(22) Filed: Mar. 22, 2016

(65) Prior Publication Data

US 2017/0276238 A1    Sep. 28, 2017

(51) Int. Cl.
*F16H 61/12*    (2010.01)
*F16H 61/686*    (2006.01)

(52) U.S. Cl.
CPC .......... *F16H 61/12* (2013.01); *F16H 61/686* (2013.01); *F16H 2061/1232* (2013.01)

(58) Field of Classification Search
CPC ............. F16H 61/12; F16H 2061/1204; F16H 2061/1232
See application file for complete search history.

(56) References Cited

U.S. PATENT DOCUMENTS

| 9,200,704 B2 | 12/2015 | Lochocki, Jr. et al. |
| 9,222,531 B2 | 12/2015 | Biggs et al. |
| 2009/0099810 A1* | 4/2009 | Schneider ............... F16D 48/06 702/150 |
| 2013/0096787 A1* | 4/2013 | Holub ..................... F16H 61/12 701/54 |

* cited by examiner

*Primary Examiner* — Edwin A Young
(74) *Attorney, Agent, or Firm* — Quinn IP Law

(57) ABSTRACT

A vehicle includes a prime mover, transmission, drive axle, and controller. The controller identifies clutches involved in establishing or maintaining a requested gear state, and detects an impending fault condition of the transmission. The controller also executes a pre-remedial control action in response to the impending fault condition, and places the transmission in a hydraulic default mode when the remedial control action does not clear the fault condition after a calibrated duration. A system includes the transmission and controller. A method for providing pre-remedial control of a transmission includes identifying clutches of the transmission that are involved in establishing or maintaining a requested gear state, and detecting an impending fault condition. The method further includes executing a pre-remedial control action in response to the impending fault condition and placing the transmission in a hydraulic default mode if the remedial control action does not clear the fault condition.

18 Claims, 2 Drawing Sheets

PRE-REMEDIAL FAULT CONTROL IN A TRANSMISSION

TECHNICAL FIELD

The present disclosure relates to pre-remedial fault control in a transmission.

BACKGROUND

A vehicle transmission receives input torque from a prime mover, typically an engine or an electric machine, and transmits an output torque to a set of drive wheels through a range of output speeds. In an automatic transmission, a hydrodynamic torque converter or an input clutch couples an engine output shaft to a transmission input member. Such a transmission may include various planetary gear sets and hydraulically-actuated clutches, with the various gear elements of the planetary gear sets interconnected to each other via different clutch combinations. In contrast, a dual-clutch transmission or DCT has two input clutches arranged on different input shafts and operable for selecting the respective oddly-numbered and evenly-numbered gear sets. In both transmission configurations, a transmission control module executes clutch shift logic to control clutch application sequencing for achieving a requested shift progression.

Transmissions may be monitored in control logic for certain types of fault conditions, e.g., clutch tie-up and engine overspeed conditions. As is well known in the art, the term "tie-up" refers to a condition in which the transmission is simultaneously in two different gear states. Shift events in an automatic transmission are ordinarily tied-up to some extent over a transient period as clutch torque capacity is removed from an offgoing clutch and increased for an oncoming clutch, and therefore all tie-up conditions are not problematic. However, if a tie-up condition persists for an extended period of time, or if clutch torque capacities of the various clutches involved in transferring or holding torque are maintained at or above a calibrated threshold torque capacity, execution of a control action may be required in order to help protect the hardware of the transmission. Engine overspeed fault conditions may result from shifts between certain gears when the resultant engine speed exceeds a level required for a commanded gear. Conventional responses to such fault conditions may be less than optimal in terms of powertrain performance, as many such actions result in disabling or severe curtailing of available drive functions.

SUMMARY

A vehicle is disclosed herein that includes a transmission and a controller. The controller closely monitors the ongoing operation of the transmission for a possible fault condition, with tie-up and overspeed fault conditions being two example fault conditions described herein. Unlike prior art solutions, the present approach first executes pre-remedial control actions in an attempt at clearing the fault condition via time-limited shift control. An intended result of the present methodology is a reduced likelihood of a loss of powerflow through the transmission by providing sufficient time for the fault condition to resolve itself prior to taking aggressive hardware-protecting remedial control actions.

The torque capacities of clutches involved in maintaining a present gear shift or for controlling torque transfer in an impending shift of the transmission, as well as all permissible gear progressions, may be recorded in a lookup table as calibrated values. Such values may correspond to a maximum allowable vehicle acceleration, which as used herein means any resultant threshold level of sudden change in vehicle speed, whether positive (accelerating) or negative (decelerating), that could be perceived by a driver and adversely affect ride quality. While the controller may ultimately execute a default remedial action in response to a sustained tie-up condition, such as pulling high-side drivers to solenoid valves of the transmission so as to force entry into a default hydraulic mode, the present approach attempts to improve upon such approaches by executing separate pre-remedial control actions, with the goal of rendering unnecessary most occurrences of the remedial actions.

In an example embodiment disclosed herein, a vehicle includes a prime mover, a transmission, a drive axle, and a controller. The prime mover is operable for generating an input torque, which is received by the transmission. The transmission produces an output torque that is ultimately received by the drive axle. The controller is programmed to identify clutches of the transmission that are involved in establishing or maintaining a requested gear state of the transmission, as well as to detect an impending fault condition of the transmission. The fault condition may be a tie-up or an overspeed condition in some embodiments. The controller then executes a pre-remedial control action with respect to the transmission in response to the detected impending fault condition, and executes a remedial control action, such as by placing the transmission in a hydraulic default mode, when the remedial control action does not clear the fault condition after a calibrated duration.

A system is also disclosed herein that includes a transmission configured to receive an input torque and produce an output torque, and having a plurality of clutches, and that also includes a controller in communication with the transmission. The controller is programmed to identify, from the plurality of clutches of the transmission, a set of clutches involved in establishing or maintaining a requested gear state. The controller is also programmed to detect an impending fault condition of the transmission, and to execute a pre-remedial control action with respect to the transmission in response to the detected impending fault condition. Additionally, the controller places the transmission in a hydraulic default mode when the remedial control action does not clear the fault condition after a calibrated duration.

A method is also disclosed pre-remedial control of a transmission. In an embodiment, the method includes identifying, via a controller, a set of clutches of the transmission that are involved in establishing or maintaining a requested gear state. The method also includes detecting an impending fault condition of the transmission, such as the tie-up or overspeed conditions noted above, and then executing a pre-remedial control action with respect to the transmission in response to the detected impending fault condition. Additionally, the method includes placing the transmission in a hydraulic default mode when the remedial control action does not clear the fault condition after a calibrated duration.

The above features and advantages and other features and advantages of the present disclosure are readily apparent from the following detailed description when taken in connection with the accompanying drawings.

DETAILED DESCRIPTION

Figure 1:
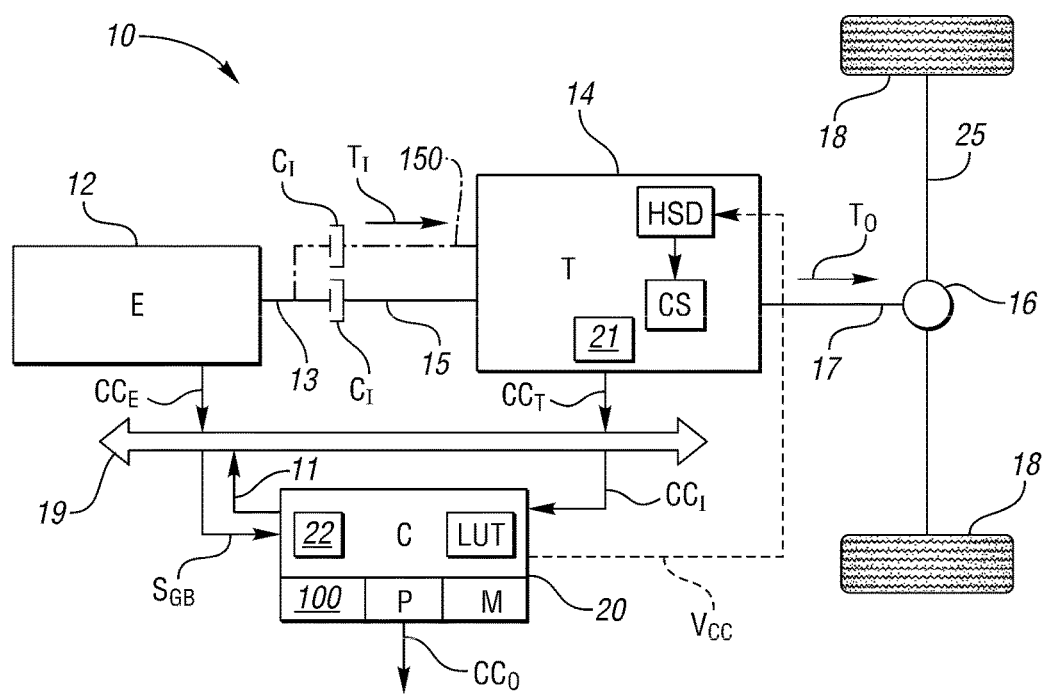
FIG. 1 is a schematic illustration of an example vehicle having a transmission and a controller that monitors the transmission for a threshold fault condition and executes pre-remedial control actions when such a fault condition is detected.

Referring to the drawings, wherein like reference numbers correspond to like or similar components throughout the several figures, an example vehicle 10 is depicted schematically in FIG. 1 having a controller 20 that is programmed to execute a method 100 for pre-remedial fault control as described herein. The vehicle 10 includes a prime mover operable for generating an input torque (arrow $T_I$), with the prime mover shown in FIG. 1 as an internal combustion engine (E) 12. Other possible prime movers include an electric machine, e.g., a motor/generator unit, which may be used in place of or in conjunction with the engine 12. The vehicle 10 also includes a transmission (T) 14 that is connected to the engine 12 and thus configured to receive the input torque (arrow $T_I$) and produce an output torque (arrow $T_O$). A drive axle 25 receives the output torque (arrow $T_O$) from an output member 17 of the transmission 14 and delivers the output torque output torque (arrow $T_O$) to a set of drive wheels 18 in order to propel the vehicle 10.

The controller 20 is configured, i.e., programmed in software and equipped in hardware, to execute the method 100, an example of which is explained below with reference to FIG. 2, and thereby allows the controller 20 to determine, via a set of calibrated lookup tables (LUT), when a threshold fault condition of the transmission 14 is present, and to automatically take pre-remedial action prior to executing any default remedial control actions that might affect powerflow. As such, use of the method 100 may allow the transmission 14 to clear impending fault conditions without resorting to remedial control actions.

The lookup tables (LUT) are intended to set up distinct boundaries for allowable clutch torque capacity for a given shift of a set of clutches (CS) of the transmission 14 involved in establishing or maintaining a requested gear state or range. As is known in the art, a high-side driver (HSD) may control the voltage supplied to pressure control solenoid valves (not shown) of the type used to supply fluid power to the clutches (CS), such that the act of powering off the high-side driver (HSD) via a driver control signal (arrow $V_{CC}$), i.e., "pulling" the high-side driver (HSD), has the effect of placing the transmission 14 in a default hydraulic mode in which powerflow through the transmission 14 is interrupted.

When executing a clutch-to-clutch shift, for instance, any holding clutches must remain locked. If an oncoming or offgoing clutch of the clutch-to-clutch shift is at or above a calibrated clutch torque capacity threshold, a tie-up fault condition may be indicated depending on the severity and duration of the tie-up. Capacities of any clutches expected to be disengaged or turned off during a given shift maneuver must also not be above a calibrated clutch capacity threshold. The controller 20 thus continuously monitors all affected clutches of a given shift or steady-state range for the presence of such a tie-up condition.

As used herein, a threshold tie-up fault condition is any tie-up of the transmission 14 in which torque capacities of involved clutches of a given shift remain above limits of the lookup tables (LUT) for longer than a calibrated duration, e.g., as determined via a timer of the controller 20. Likewise, an overspeed condition occurs whenever an input speed to the transmission 14 is above a level required for a presently commanded gear, e.g., when a request is made for a downshift from a higher gear to a particular lower gear that is contrary to a calibrated permissible shift progression.

With further reference to the vehicle 10 of FIG. 1, the engine 12 includes an output shaft 13 coupled to an input member 15 of the transmission 14, for instance via an input clutch ($C_I$) or a hydrodynamic torque converter in a multi-speed transmission, or via two such input clutches ($C_I$) in a dual-clutch transmission (DCT) configuration as shown in phantom. In a DCT, another input member 150 is used in conjunction with the input member 15, such that the input member 15 may serve as the evenly-numbered gear shaft and the input member 150 may serve as the oddly-numbered gear shaft or vice versa. Regardless of the embodiment of the transmission 14, the input torque (arrow $T_I$) feeds into the transmission 14, and the output torque (arrow $T_O$) from the transmission 14 is ultimately transmitted to the drive wheels 18 via the output member 17 and an optional final drive set 16.

The controller 20 of FIG. 1 may communicate with required elements of the vehicle 10 via control signals (arrow 11) over a controller area network or CAN bus 19, or over any other suitable onboard communications network as shown. Various data elements are received and processed by the controller 20 in executing the method 100 and/or for maintaining overall shift control over the transmission 14. For instance, the controller 20 may receive engine control values (arrow $CC_E$) and transmission control values (arrow $CC_T$) typical of transmission shift control logic. The engine control values (arrow $CC_E$) may include, by way of example, a throttle level, engine speed, engine torque, and crank position. Such values may be measured or calculated in the conventional manner and used in the overall shift control of the transmission 14. The transmission control values (arrow $CC_T$) may include similar speed and torque positions, sump temperatures, a park, reverse, neutral, drive, low (PRNDL) setting of the transmission 14, which may be known from shift logic or detected via a position of a shift lever (not shown), and the like.

In addition, the transmission control values (arrow $CC_T$) may also include specific information usable by the controller 20 in executing the method 100, including a gearbox status signal (arrow $S_{GB}$) and clutch control input signals (arrow $CC_I$) describing clutch capacities of the various clutches in the set of clutches (CS). The controller 20 may generate control output signals (arrow $CC_O$) enforce any pre-remedial control actions taken as a result of execution of the method 100 using at least the gearbox status signal (arrow $S_{GB}$) and the clutch control input signals (arrow $CC_I$). The particular values used for the gearbox status signal (arrow $S_{GB}$) and the clutch control input signals (arrow $CC_I$) may vary with the particular configuration of the transmission 14. Example embodiments of the transmission 14 include a 9-speed and a 10-speed transmission, particularly when having a binary clutch 21 such as a selectable one-way clutch that may be particularly susceptible to damage if applied or released at certain times.

Still referring to FIG. 1, the controller 20 may be configured as a computer device or multiple devices having tangible, non-transitory memory device (M) on which is recorded instructions encoding the method 100. The controller 20 may include elements as a microprocessor (P), circuitry including but not limited to a timer 22, a high-speed clock, analog-to-digital circuitry, digital-to-analog circuitry, a digital signal processor, and any necessary input/output devices and other signal conditioning and/or buffer circuitry. The memory (M) may include read only memory, e.g., magnetic and/or optical memory, as well as random access memory, electrically-erasable programmable read-only memory, and the like. However configured, the controller 20 executes the method 100 from memory (M) using the lookup tables (LUT), with an example of the method 100 shown in FIG. 2, which will now be explained in detail with continued reference to the structural elements of FIG. 1.

Figure 2:
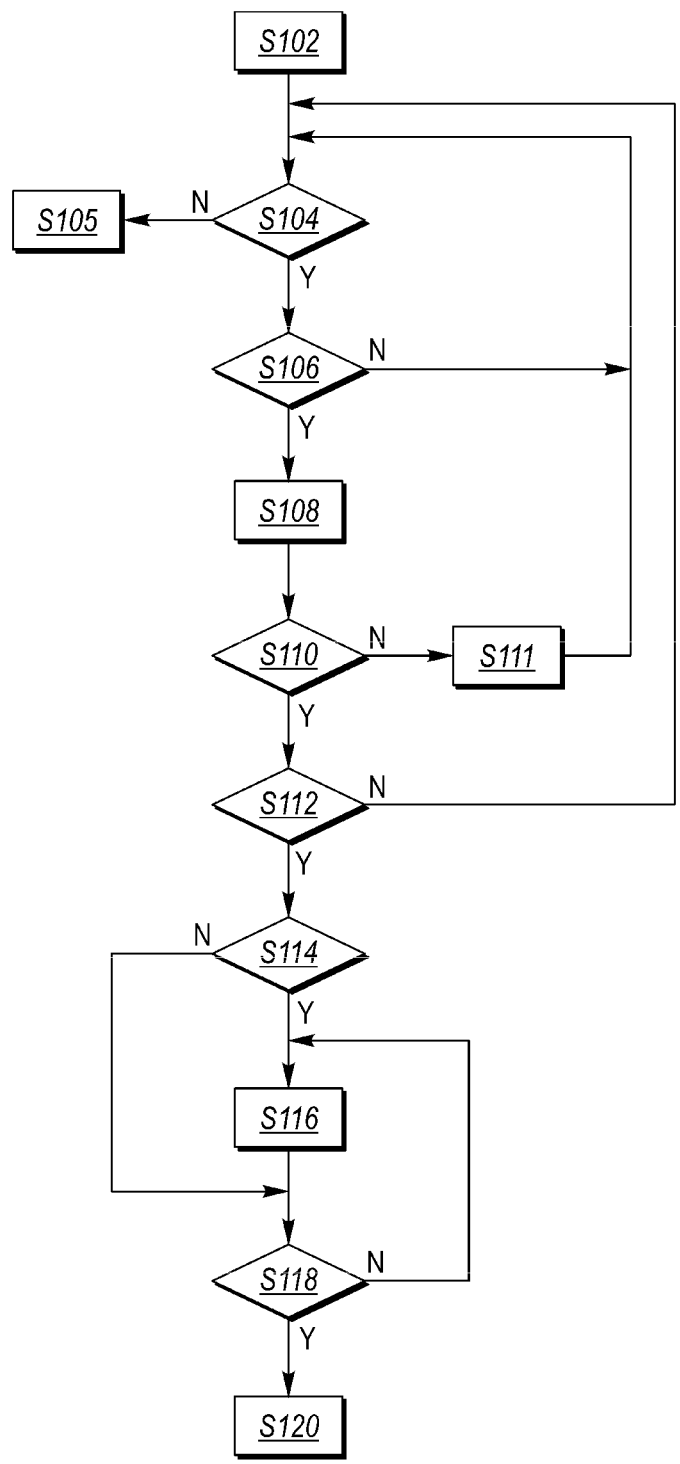
FIG. 2 is a graphical flow chart describing an example method for monitoring the transmission of FIG. 1 for the potential fault condition and executing pre-remedial actions in response thereto.

FIG. 2 depicts an example embodiment of the method 100 that takes certain pre-remedial control actions prior to a hard default remedial control action such as pulling the high-side drivers (HSD) to force a default hydraulic mode, limiting shifts to one shaft in DCT embodiments, or interrupting powerflow through the transmission 14. Execution of the method 100 allows the controller 20 to modify gear progression scheduling to, for instance, hold the current gear state for a calibrated duration or abort the requested shift for a few seconds before attempting the requested shift again. Intervention by the controller 20 may allow the fault condition to clear itself with only a minimal perceptible impact on powerflow and overall drive quality. In practice, two separate monitoring logic modules of the controller 20 may be running simultaneously, e.g., a dedicated tie-up monitor and a command shift monitor respectively monitoring and responding to tie-up and overspeed fault conditions.

When the controller 20 of FIG. 1 is certain that the fault condition is truly active, the controller 20 is able to re-direct key clutch control system commands as a "return-to-previous-gear/range" or "RPR" shift and hold this action for a calibrated amount of time necessary for determining if the fault condition has in fact cleared, or by redirecting the transmission 14 to a minimum gear permitted for the particular operating conditions in the case of the overspeed fault condition. In the event of fault maturation, additional powerflow-altering actions can be taken by the controller 20 to protect hardware of the transmission 14, e.g., by forcing entry into a hydraulic default mode.

Beginning with step S102, the controller 20 of FIG. 1 processes various signals including the transmission control values (arrow $CC_T$), the engine control values (arrow $CC_E$), the gearbox status signals ($S_{GB}$), and the clutch control input signals ($CC_I$), and then identifies a set of the clutches (CS) of the transmission 14 that are involved in establishing or maintaining a requested gear state of the transmission 14. The controller 20 also determines if an impending fault condition of the transmission 14 is present such as a fault condition indicative of a tie-up or an overspeed condition.

Depending on the fault condition, the controller 20 may calculate clutch capacities for any of the clutches (CS) of FIG. 1 involved in a requested shift, and then compare such values to threshold clutch capacities from the lookup tables (LUT), and/or the controller 20 may compare a requested shift progression to a permissible shift progression also recorded in memory (M). A threshold tie-up condition is present when the determined actual clutch torque capacities exceed the calibrated clutch torque capacity for the predetermined number of the involved clutches for longer than a calibrated duration. The method 100 proceeds then proceeds to step S104.

At step S104, the controller 20 next initiates the timer 22 of FIG. 1 and determines, at the end of a first calibrated duration, whether the fault criteria of step S104 remain satisfied. Step S104 helps the controller 20 to avoid taking unnecessary control actions in response to what may be only transient tie-ups that will clear themselves after an acceptable delay. For example, in some shift events the overall shift control logic for the transmission 14 may intentionally tie-up the transmission 14, such as by purposefully slipping one of the clutches (CS) involved in the shift so as to achieve a desired shift feel. In such a situation, a true tie-up condition is not actually present. Control actions in such a false positive case would be unnecessary and could affect overall drive quality and enjoyment. The method 100 proceeds to step S105 if the fault condition clears. Step S106 is executed in the alternative if the fault condition persists.

Step S105 entails recording a diagnostic code in memory (M) that the fault detected at step S102 has cleared. The controller 20 may thereafter proceed with control of the transmission 14 in the usual manner.

At step S106, the controller 20 allows the timer 22 to continue to advance for a second calibrated duration, such as about 200-300 ms. Steps S104 and S106 continue in a loop until the controller 20 determines at step S106 that the fault condition has persisted beyond the second calibrated duration, at which point the method 100 proceeds to step S108.

Step S108 includes executing a pre-remedial control action with respect to the transmission 14 in response to the detected impending fault condition in an attempt at clearing the fault condition. The pre-remedial control action may vary with the fault condition. For a tie-up condition, step S108 may include commanding the RPR shift noted above, i.e., a return to a prior gear or range. For example, if an operator of the vehicle 10 of FIG. 1 requests a shift from $3^{rd}$ gear to $4^{th}$ gear and the monitor for the tie-up condition detects a tie-up fault, the controller 20 may command a return to $3^{rd}$ gear, with the timer 22 continuing and the method 100 proceeding to step S110. For an overspeed condition, the controller 20 may access a calibrated gear progression map in its memory (M) and command a shift to a closest permissible gear or range, e.g., by commanding a shift from $8^{th}$ gear to $3^{rd}$ gear in response to a request from $8^{th}$ gear to $1^{st}$ gear.

At step S110, the controller 20 may determine if the fault condition remains active after the control action of step S110. If the fault condition is no longer active, the controller 20 proceeds to step S111. The controller 20 executes step S112 if the fault condition remains active.

At step S111, the controller 20 may hold the control action commanded at step S108 for a duration sufficient for ensuring the fault condition remains cleared, such as 5 seconds, then returns to step S104.

Step S112 includes determining whether the timer has reached a third calibrated duration, e.g., 350 ms. The method 100 proceeds to step S114 when the third calibrated duration is reached, with the controller 20 repeating steps S104-S112 in a loop until the fault either clears or the third calibrated duration has elapsed, at which point the method 100 proceeds to step S114.

Steps S114-S118 are executed in a loop to ensure that the clutches and valves of the transmission 14 are in a prepared state for execution of the remedial control action that will occur at step S120. Some transmissions may include particularly fragile or sensitive hardware, such as binary elements used in a selectable one-way clutch. For instance, some transmissions use fluid power to move a blocking ring and thereby depress or release spring-loaded sprags or struts to hold torque in one or two rotational directions, or to permit freewheeling. Such torque holding elements, unlike friction elements which are designed to slip, may fracture if applied or released under certain conditions.

Therefore, step S114 may entail verifying that any valves used for control of the blocking ring are properly staged.

Step S114 may entail receiving valve position data, which is known in conventional shift control architectures and part of the clutch control input signals (arrow $C_I$), and determining if the pressure control solenoids and clutch select solenoids (not shown) are appropriately set for eventual execution of step S120. If the control valves are properly staged, the method 100 proceeds directly to step S120. Otherwise, the method 100 proceeds to step S116.

Step S116 includes commanding the pressure control solenoids and clutch select valves to zero, thereby reducing pressure to the controlled clutches and any binary elements. Step S116 could also include measuring slip across a selectable one-way clutch, such as the binary clutch 21 of FIG. 1, to determine if the device is overrunning, and then staging pressure to the device 21 to place the binary clutch 21 into a favorable state for execution of step S120, i.e., so the binary clutch 21 is not commanded on or off too quickly. The method 100 then proceeds to step S118.

Step S118 includes determining the timer 22 has reached a fourth calibrated duration such as 500 ms. Step S116 may be repeated with step S118 until the fourth calibrated duration has been met. The method 100 then proceeds to step S120.

At step S120, the controller 20 may execute a default remedial control action in the typical manner. Control actions responsive to fault conditions that persist and ultimately mature relative to the fourth calibrated threshold include pulling a high-side control driver for any affected clutch control solenoids, which effectively forces entry of the transmission 14 into a hydraulic default mode and a loss of powerflow through the transmission 14. For a DCT, the controller 20 may restrict shifts on one input shaft or take any other appropriate control actions. In this manner the method 100 may improve drive quality and enhance the drive experience by providing for pre-remedial actions short of drive-compromising remedial actions.

While the best modes for carrying out the present disclosure have been described in detail, those familiar with the art to which this disclosure relates will recognize various alternative designs and embodiments for practicing the disclosure within the scope of the appended claims.

The invention claimed is:

1. A vehicle comprising:
   a prime mover operable for generating an input torque;
   a transmission connected to the prime mover that is configured to receive the input torque and produce an output torque;
   a drive axle that receives the output torque; and
   a controller in communication with the transmission, wherein the controller is programmed to:
      identify clutches of the transmission that are involved in establishing or maintaining a requested gear state;
      detect a threshold fault condition of the transmission;
      execute a pre-remedial control action with respect to the transmission in response to the threshold fault condition; and
      place the transmission in a hydraulic default mode when the pre-remedial control action does not clear the threshold fault condition after a calibrated duration.

2. The vehicle of claim 1, wherein the threshold fault condition is a tie-up condition of the clutches in which an actual clutch torque capacity of each of the clutches exceeds a corresponding calibrated clutch torque capacity for longer than the calibrated duration, and the pre-remedial control action includes commanding a return-to-prior-range shift of the transmission.

3. The vehicle of claim 1, wherein the threshold fault condition is an overspeed condition of the prime mover and the pre-remedial control action is a commanded shift to a default gear of the transmission.

4. The vehicle of claim 1, wherein the transmission includes a binary clutch, and wherein the controller is programmed to control fluid pressure to the binary clutch prior to placing the transmission in the hydraulic default mode.

5. The vehicle of claim 1, wherein the transmission is a dual-clutch transmission having a first input clutch arranged on a first input shaft to the transmission and a second input clutch arranged on a second input shaft to the transmission, and wherein the pre-remedial control action includes restricting control of a shift to one of the first and second input clutches.

6. The vehicle of claim 1, wherein the controller commands a zero voltage level from a respective high-side driver of each of the clutches to place the transmission in the hydraulic default mode.

7. A system comprising:
   a transmission configured to receive an input torque and produce an output torque, and having a plurality of clutches; and
   a controller in communication with the transmission, wherein the controller is programmed to:
      identify, from among the plurality of clutches of the transmission, a set of clutches involved in establishing or maintaining a requested gear state;
      detect a threshold fault condition of the transmission;
      execute a pre-remedial control action with respect to the transmission in response to the threshold fault condition; and
      place the transmission in a hydraulic default mode when the pre-remedial control action does not clear the threshold fault condition after a calibrated duration.

8. The system of claim 7, wherein the threshold fault condition is a tie-up condition of the set of clutches in which an actual clutch torque capacity of each of the clutches in the set of clutches exceeds a corresponding calibrated clutch torque capacity for longer than the calibrated duration, and the pre-remedial control action includes commanding a return-to-prior-range shift of the transmission.

9. The system of claim 7, wherein the transmission is connected to a prime mover, the threshold fault condition is an overspeed condition of the prime mover, and the pre-remedial control action is a commanded shift to a default gear of the transmission.

10. The system of claim 7, wherein the transmission includes a binary clutch, and wherein the controller is programmed to control fluid pressure to the binary clutch prior to placing the transmission in the hydraulic default mode.

11. The system of claim 7, wherein the transmission is a dual-clutch transmission having a first input clutch arranged on a first input shaft to the transmission and a second input clutch arranged on a second input shaft to the transmission, and wherein the pre-remedial control action includes restricting control of a shift to one of the first and second input clutches.

12. The system of claim 7, wherein the controller commands a zero voltage level from a respective high-side driver of each clutch forming the set of clutches to place the transmission in the hydraulic default mode.

13. A method for providing a pre-remedial control action of a transmission, the method comprising:

identifying, via a controller, a set of clutches of the transmission that are involved in establishing or maintaining a requested gear state;

detecting a threshold fault condition of the transmission;

executing a pre-remedial control action with respect to the transmission in response to the threshold fault condition; and placing the transmission in a hydraulic default mode if the pre-remedial control action does not clear the threshold fault condition after a calibrated duration.

14. The method of claim 13, wherein detecting a threshold fault condition of the transmission includes detecting a fault condition indicative of a tie-up condition in which an actual clutch torque capacity of each of the clutches in the set of clutches exceeds a corresponding calibrated clutch torque capacity for longer than the calibrated duration, and executing the pre-remedial control action includes commanding a return-to-prior-range shift of the transmission.

15. The method of claim 14, wherein the transmission is connected to a prime mover, the threshold fault condition is an overspeed condition of the prime mover, and executing a pre-remedial control action includes executing a commanded shift to a default gear of the transmission.

16. The method of claim 14, wherein the transmission includes a binary clutch, and wherein executing a pre-remedial control action includes controlling fluid pressure to the binary clutch prior to place the transmission in the hydraulic default mode.

17. The method of claim 14, wherein the transmission is a dual-clutch transmission having a first input clutch arranged on a first input shaft to the transmission and a second input clutch arranged on a second input shaft to the transmission, and wherein executing a pre-remedial control action includes restricting control of a shift to one of the first and second input clutches and shafts.

18. The method of claim 14, wherein placing the transmission in a hydraulic default mode includes commanding, via the controller, a zero voltage level from a respective high-side driver of each clutch forming the set of clutches to place the transmission in the hydraulic default mode.

* * * * *